US011988345B2

(12) United States Patent
Yesilyaprak et al.

(10) Patent No.: US 11,988,345 B2
(45) Date of Patent: May 21, 2024

(54) SMART, ADAPTIVE WAVELENGTH LIGHTING SYSTEM

(71) Applicants: ATATÜRK ÜNIVERSITESI BILIMSEL ARASTIRMA PROJELERI BIRIMI, Erzurum (TR); TÜRKIYE BILIMSEL VE TEKNOLOJIK ARASTIRMA KURUMU, Ankara (TR)

(72) Inventors: Cahit Yesilyaprak, Erzurum (TR); Murat Koçak, Antalya (TR)

( * ) Notice: Subject to any disclaimer, the term of this patent is extended or adjusted under 35 U.S.C. 154(b) by 18 days.

(21) Appl. No.: 17/609,157

(22) PCT Filed: Jun. 24, 2020

(86) PCT No.: PCT/TR2020/050545
§ 371 (c)(1),
(2) Date: Nov. 5, 2021

(87) PCT Pub. No.: WO2020/263208
PCT Pub. Date: Dec. 30, 2020

(65) Prior Publication Data

US 2022/0214021 A1 Jul. 7, 2022

(30) Foreign Application Priority Data

Jun. 26, 2019 (TR) ............................ TR2019/09524

(51) Int. Cl.
*F21S 10/02* (2006.01)
*F21V 23/00* (2015.01)
*F21V 23/04* (2006.01)

(52) U.S. Cl.
CPC .......... *F21S 10/026* (2013.01); *F21V 23/003* (2013.01); *F21V 23/0464* (2013.01)

(58) Field of Classification Search
CPC ... F21S 10/026; F21V 23/003; F21V 23/0464
See application file for complete search history.

(56) References Cited

U.S. PATENT DOCUMENTS

| | | | | |
|---|---|---|---|---|
| 2007/0206375 A1* | 9/2007 | Piepgras | A43B 3/50 | 362/147 |
| 2010/0270933 A1* | 10/2010 | Chemel | H05B 47/155 | 315/130 |
| 2010/0301769 A1* | 12/2010 | Chemel | F21V 29/63 | 315/294 |

(Continued)

FOREIGN PATENT DOCUMENTS

| | | | |
|---|---|---|---|
| KR | 20120117286 | A | 10/2012 |
| TR | 201704034 | U | 10/2017 |
| WO | 2019054958 | A2 | 3/2019 |

OTHER PUBLICATIONS

International Search Report for corresponding PCT/TR2020/050545, dated Jul. 9, 2021.

(Continued)

*Primary Examiner* — Bryon T Gyllstrom
(74) *Attorney, Agent, or Firm* — Egbert, McDaniel & Swartz, PLLC

(57) ABSTRACT

A system intended to be used for lighting purposes of an environment, where a light measurement at a wavelength is performed, is also desired to be monitored, without affecting the measurement performed in a dark environment.

17 Claims, 4 Drawing Sheets

(56) References Cited

U.S. PATENT DOCUMENTS

| | | | | |
|---|---|---|---|---|
| 2012/0206050 | A1* | 8/2012 | Spero | B60Q 1/1423 315/152 |
| 2012/0306381 | A1* | 12/2012 | Adler | F21V 23/0442 315/152 |
| 2013/0002144 | A1* | 1/2013 | Adler | F21S 2/00 315/153 |
| 2014/0043545 | A1* | 2/2014 | Yamamoto | G02B 27/0025 362/253 |
| 2017/0267162 | A1* | 9/2017 | Remillard | F21V 23/003 |
| 2020/0056771 | A1* | 2/2020 | Cho | G06F 1/3215 |
| 2023/0055364 | A1* | 2/2023 | Lewis | G09F 19/22 |

OTHER PUBLICATIONS

Written Opinion of the International Searching Authority for corresponding PCT/TR2020/050545, dated Jul. 9, 2021.

* cited by examiner

SMART, ADAPTIVE WAVELENGTH LIGHTING SYSTEM

TECHNICAL FIELD

The invention relates to a system intended to be used for lighting purposes of an environment, where a light measurement at a wavelength is performed, is also desired to be monitored, without affecting the measurement performed in a dark environment.

STATE OF THE ART

As a light source, the brightness of an object at a specific color can be measured and information about the quality and quantity of that object can be obtained. Such measurements are often performed in natural sciences such as chemistry, biology, physics and astronomy, and in industrial applications.

The safety of the environment and the efficiency of the measurement are ensured by using a monitoring camera during the measurement. It is rather difficult for this camera to record due to the dark environment. Although most security cameras have infrared illuminators on them, running them is not possible due to the negative effect they will impose on the measurement. As a result, light measurements are paused occasionally to monitor the environment with the camera. However, these both results in interrupting the performed measurement and does not allow continuous monitoring of the environment.

In a light measurement performed in the astronomy field, a light measurement of a stellar object within a specific wavelength interval (for example between 700 nm-750 nm) is performed using an optical telescope which resides in a moving dome. The dome telescope, which is in motion during light measurement, and the cables connected to it are also required to be monitored in real time. It is important for the telescope to look at the center of the dome opening so that the dome edges do not prevent the telescope from receiving light. Again, due to the motion of the telescope, there is a possibility of tangling cables in the environment. Real-time monitoring of the environment against these and similar situations allow the user to take precautions when necessary. In order not to affect the performed measurements, the environment should be extremely dark and isolated from external illuminators. This dark environment also prevents the camera from recording reliable images.

Summary of the patent application No. TR2017/13513 is; "The invention is a multispectral mobile imaging system; comprising a mobile device with a display, operating system and customized camera module, a case where the customized camera module center of the mentioned mobile device and imaging assemblies are positioned with alignment and in parallel to each other, which keeps all the system elements together, onto which the multiple filter body—1 inside which there are at least two A Filter/Filters and filter body slot—1 and the multiple filter body—2 inside which there are at least two B Filter/Filters and filter body slot—2 and external battery are removably integrated onto the slots thereon, lighting set which is removably attached without requiring additional tools to the filter body socket—2 on said case with lighting groups that can emit at least one narrow band radiation from each of the UV (Ultraviolet)+VIS (Visible)+IR (Infrared) wavelength ranges and having system with dark room head, macro lighting set and macro light isolation head, without ocular, viewfinder, excitation filters or dichroic mirror and software with integrated operation." Although the patent mentioned in this document is a system having a light source with a different wavelength, it does not comprise a mechanism to select the suitable type of light according to the measurement made in the environment. User has to determine the type of light to be used.

Summary of another application number TR 2017/04034 titled "Light source with multiple wavelengths." is stated as; "This invention relates to a portable light source which provides illumination at a wavelength required particularly by security forces in laboratory and/or in crime scene investigation operations in the field and which provides lighting at multiple wavelengths with a single head." Although this mechanism is a system having a narrow band light source with a different wavelength as mentioned above, it does not comprise a mechanism to select the suitable type of light according to the measurement made in the environment. Again, the type of light has to be determined by the user himself.

As a result, improvements are being made in smart adaptive wavelength lighting systems, so new embodiments that will eliminate the disadvantages mentioned above and provide solutions for existing systems are needed.

OBJECT OF THE INVENTION

The present invention relates to a smart adaptive wavelength lighting system that meets the requirements mentioned above, while eliminating all disadvantages and providing some additional advantages.

The main purpose of the invention is to provide a smart adaptive wavelength lighting system which, depending on the light from the object that is worked on in studies/experiments where light is used, provides illumination of this object and fixed or moving other objects in the environment of this object at a different wavelength which does not interfere with the ongoing study/experiment, and allows the environment of the study/experiment to be monitored reliably.

Another purpose of the invention is to provide a smart, adaptive wavelength lighting system named as "condition monitoring" in Industry 4.0 systems where problems are solved as soon as possible or which allows problems to be detected without even occurring, by detecting factors external to the experiment such as tangling cables etc., apart from observing the experiment. A smart adaptive wavelength lighting system which allows monitoring of an environment where a measurement is performed, in dark environments where light measurements are performed at a certain wavelength, without affecting the performed measurement, characterized by comprising

- at least one light measuring device,
- at least one camera to observe the environment of the light measurement,
- at least one lighting device that allows illumination of the environment.

The structural characteristics and all advantages of the invention will be understood more clearly through the following figures and the detailed explanation written with reference to these figures. Therefore, the evaluation should be based on these figures and the detailed description.

DESCRIPTION OF DRAWINGS

The embodiments of the present invention and its advantages with further elements will become clear based on the drawings described below.

DESCRIPTION OF THE REFERENCES IN FIGURES

Figure 1:
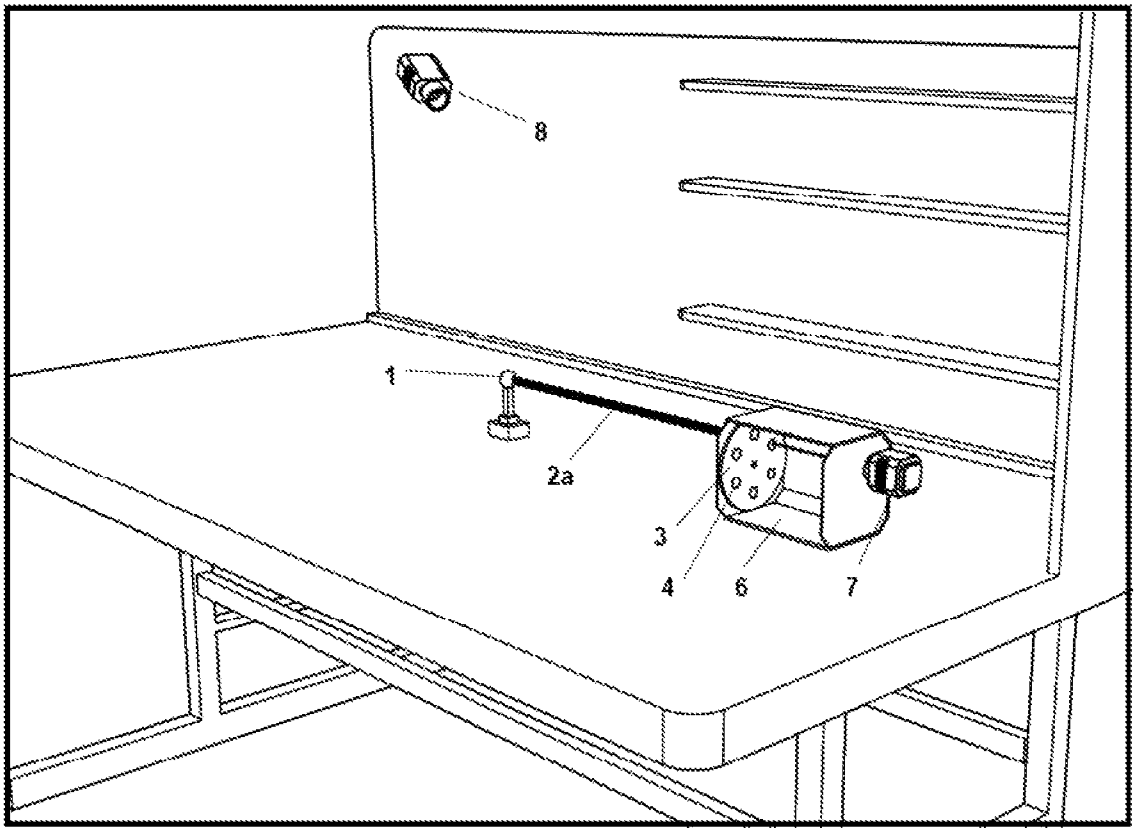
FIG. 1 is the light measurement device and monitoring camera mechanism of the invention.
Figure 2:
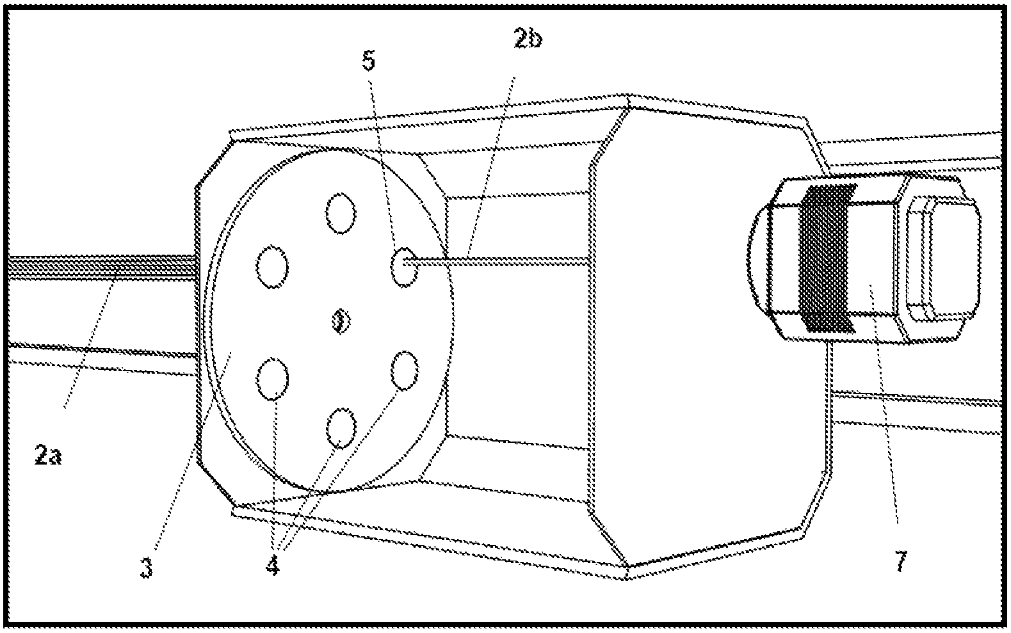
FIG. 2 is a drawing of the inner mechanism of the light measurement device of the invention.
Figure 3:
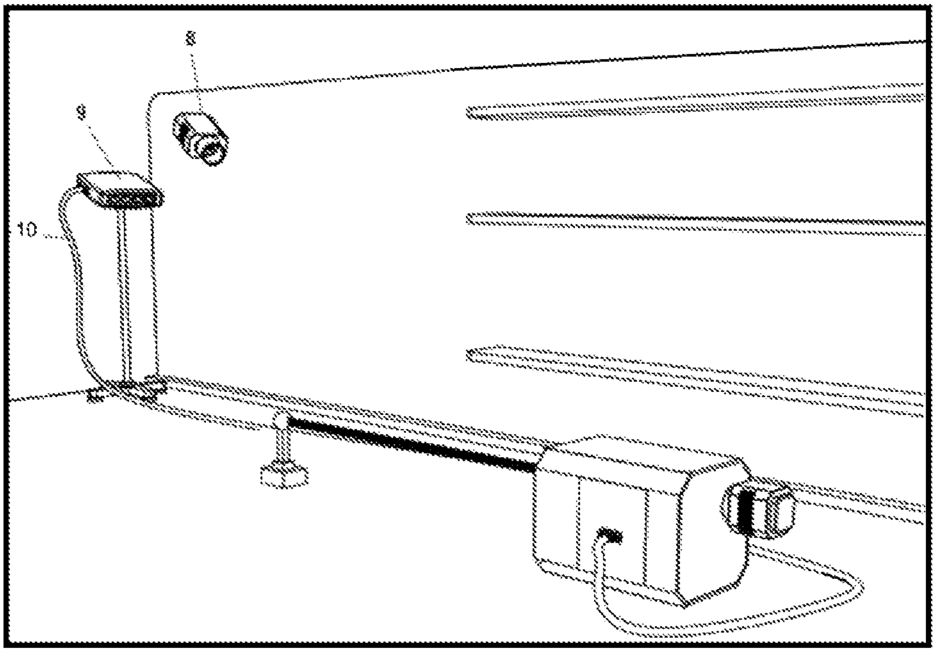
FIG. 3 is a drawing of the smart adaptive wavelength lighting system of the invention.
Figure 4:
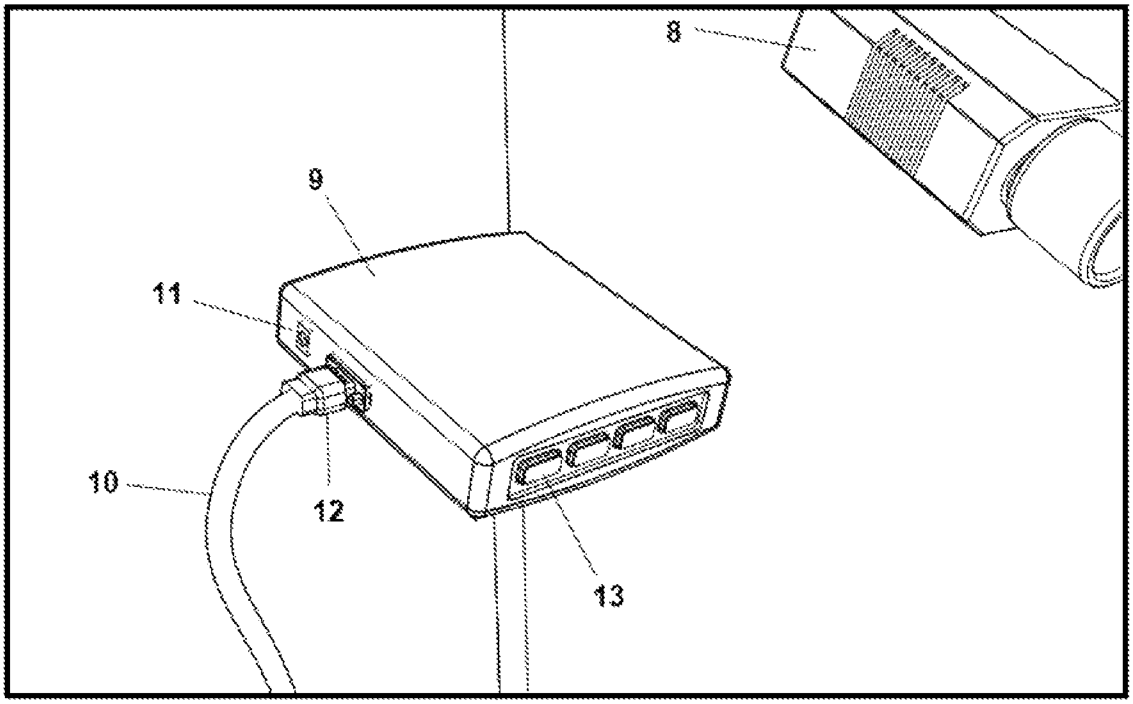
FIG. 4 is a drawing of the lighting device of the invention.
Figure 5:
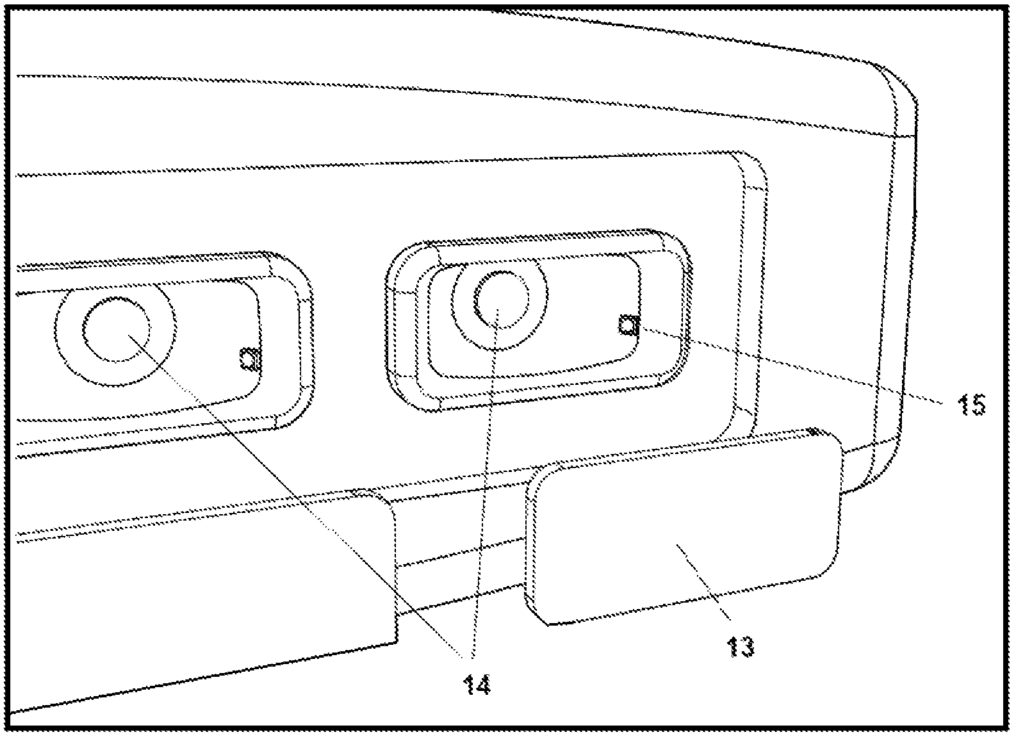
FIG. 5 is a drawing of the light source exit window of the lighting device of the system.
Figure 6:
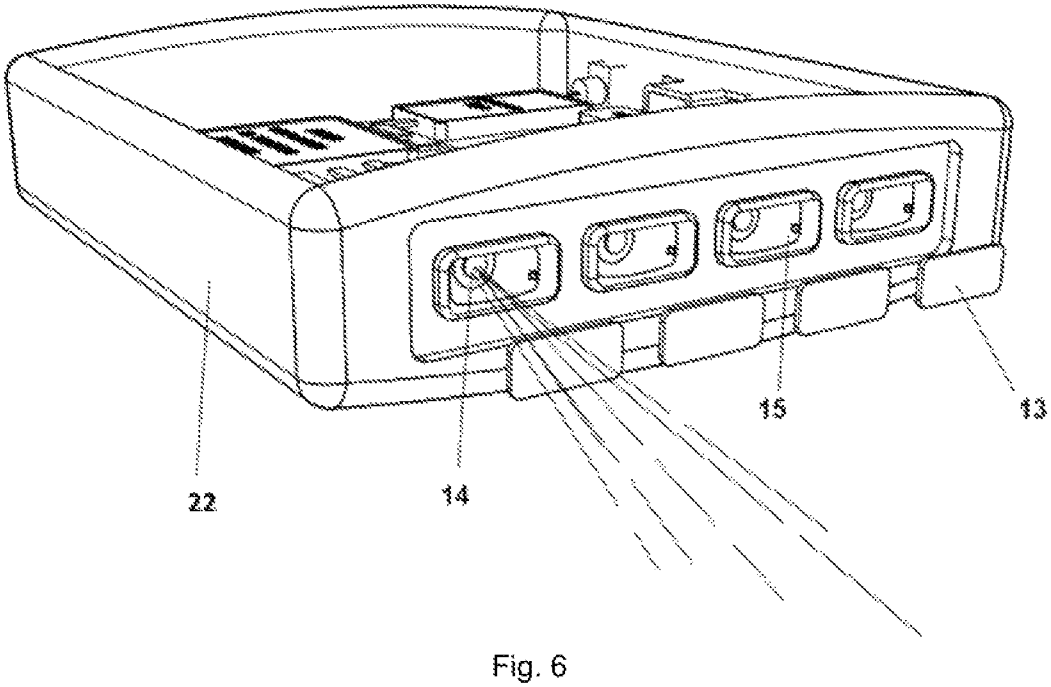
FIG. 6 is a perspective drawing of the lighting device of the invention.
Figure 7:
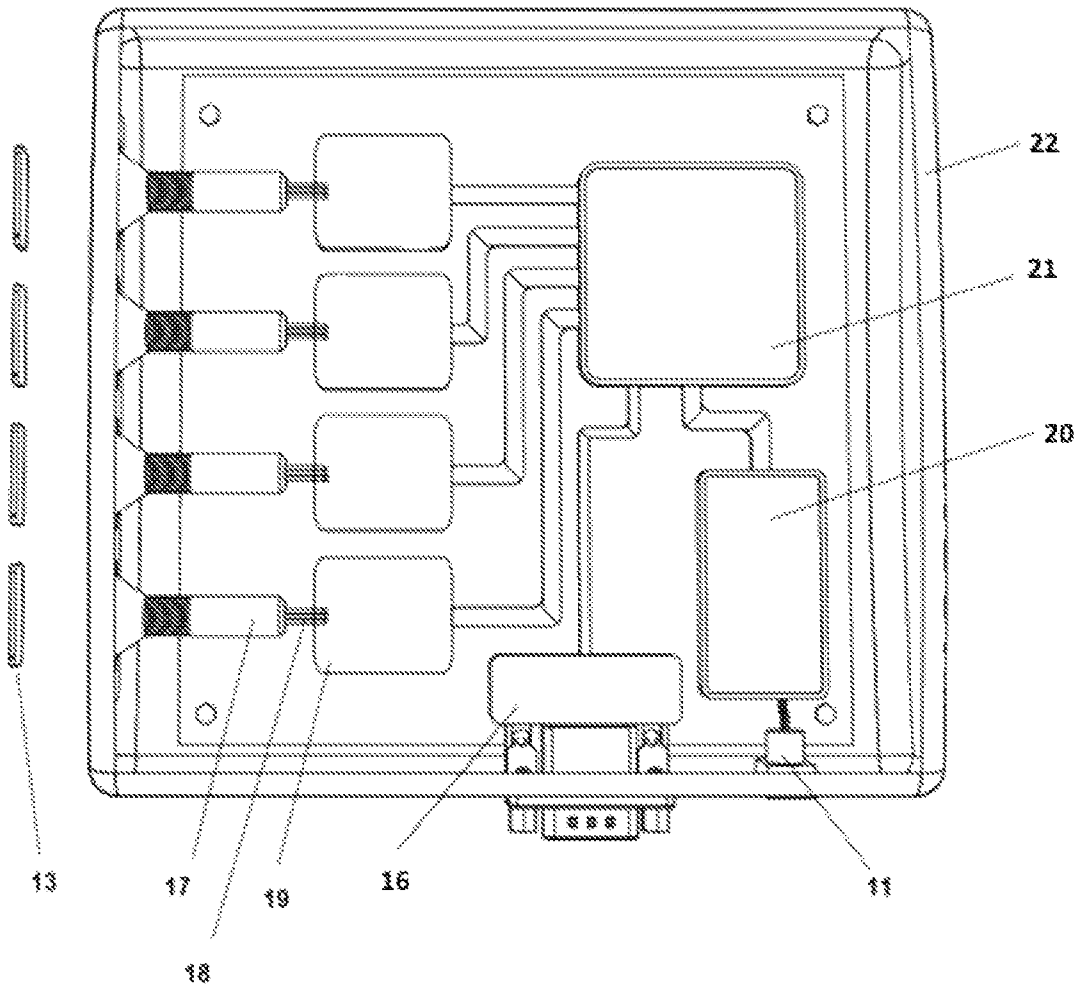
FIG. 7 is a drawing of the inner mechanism of the lighting device of the invention.

1. Object of the light measurement
2*a*. Polychromatic light from the object
2*b*. Light passing through active filter
3. Filter wheel
4. Optical filters
5. Active filter
6. Light measuring device
7. Photometer
8. Camera
9. Lighting device
10. Data cable
11. Supply connector
12. Data connector
13. Optical filter window
14. Exit window
15. Sensor
16. Filter module
17. Light source
18. Sensor cables
19. Light source driver and stabilization module
20. Power supply
21. Central control and calculation module
22. Device box

DETAILED DESCRIPTION OF THE INVENTION

In the herein detailed description, the preferred embodiments of smart adaptive wavelength lighting system of the invention are described only for a better understanding of the subject matter, without posing any limitations.

Parameters related to the quality and quantity of the object of the light measurement (1) as an active or passive light source are obtained by polychromatic light measurements. Such measurements are often performed in natural sciences such as chemistry, biology, physics and astronomy, and in industrial applications.

Fundamentally, in the invention, there is at least one light measuring device (6), at least one camera (8) which allows observing the environment where the light measurement is performed and at least one lighting device (9) which provides lighting of the environment.

A filter wheel (3) introduced in the light measuring device (6) is rotated and the optical filter (4) in the desired wavelength range is selected. The selected optical filter (4) becomes the active filter (5) as it will transmit the light within the desired wavelength range. The polychromatic light (2*a*) coming from the object of the light measurement (1) passes through the mentioned active filter (5) and only the light passing through the active filter (2*b*) at the desired wavelength reaches the photometer (7), which counts photons. The mentioned light meter (7) is at the far end of the light meter (6) away from the side where the light passing through the said active filter (2*b*) enters.

In addition, apart from the light meter (6), the environment can be monitored by means of the camera (8), which allows observing of the environment where the light measurement is performed.

In the lighting device introduced in the system (9), light sources (17) which are able to produce light at different wavelengths and a filter module (16) which receives the information regarding which optical filter (4) on the mentioned filter wheel (3) will be selected to become the active filter (5) are provided. A central control and calculation module (21) receive the active filter (5) information from the mentioned filter module (16) to determine the light source (17) at a different wavelength range. The processing of all data and control of the system is carried out by the mentioned central control and calculation module (21). The central control and calculation module (21) allows it to be activated by informing the driver stabilization module (19) about the light source which activates the light source (17) in a wavelength range other than the wavelength range of the active filter (5) about the determined light source (17) to be activated. This allows only the desired wavelength range of light in the polychromatic light (2*a*) from the object to be transmitted. Thus, light passing through the active filter (2*b*) is obtained and only the rays in this range then reach the photometer (7) and the measurement is performed. The light that emerges from the said lighting device (9) and is selected so that it cannot pass through the active filter cannot enter the light measuring device (6) and does not affect the measurement results. The light that cannot pass through the active filter is only used to illuminate the environment.

Power is supplied to the mentioned lighting device (9) via the supply connector (11) and/or the power supply (20). Furthermore, the lighting device (9) is connected to the filter wheel (3) by a data cable (10) and data connector (12). The lighting device (9) receives the active filter (5) information via this data line and transmits it to the central control and calculation module (21) via the filter module (16) therein. In this way, the exact wavelength range in which the measurement is being performed can be determined by the central control and calculation module (21). Centralized control and calculation module (21) determine a wavelength interval outside the wavelength interval of the performed measurement and determines the light source (17) on the lighting device (9) corresponding to this interval. The mentioned central control and calculation module (21) allows the necessary power to be supplied to the light source (17) in order to allow the determined light source (17) to be operated by issuing commands to the light source driver and stabilization module (19) to which the light source (17) is connected. Therefore, it illuminates the environment with light at a different wavelength than the wavelength of the medium being measured.

All the structures in the lighting device (9) are collected in a device box (22) made of a material resistant to all kinds of physical effects.

In a preferred embodiment of the invention, the exit rays are made to have a narrower wavelength by introducing an optical filter window (13) at the exit window (14) of the light source (17). Therefore, the rays exiting the lighting device (9) are completely outside the measured wavelength range. By selecting optical filter windows (13) having extremely narrow profiles, contamination of the light used for lighting to the spectral range of the active filter (5) can be prevented.

In a preferred embodiment of the invention, a sensor (15) was installed in the output window of the light source (17) so that the lighting level remains constant and does not cause artificial changes. The output of the mentioned sensor (15) is used to keep the brightness of the light at the output of the light source (17) constant by returning through the sensor cables (18) to the light source driver and stabilization module (19).

In a preferred embodiment of the invention, LED light emitting diodes with different wavelengths, lasers with different wavelengths, or monochromators with adjustable wavelengths of the emitted light may be selected as the light source (17).

In a preferred embodiment of the invention, the said sensor (15) can be selected as a photodiode.

The invention claimed is:

1. A smart adaptive wavelength lighting system that allows monitoring in a dark environment on which light measurements are performed at a certain wavelength without affecting a performed measurement, the smart adaptive wavelength lighting system comprising:

at least one light measuring device comprising:

at least one filter wheel having an optical filter in a desired wavelength range wherein the measurement in performed; and at least one photometer that counts photons in polychromatic light from the measurement passing through the optical filter after the optical filter has been selected from the at least one filter wheel;

at least one camera that observes the dark environment of the light measurement; and at least one lighting device that illuminates the dark environment.

2. The smart adaptive wavelength lighting system of claim 1, further comprising:

at least one light source selected from the group consisting of light emitting diodes of different wavelengths, lasers of different wavelengths, and monochromotors with adjustable wavelengths, said at least one light source being inside said at least one lighting device.

3. The smart adaptive wavelength lighting system of claim 2, further comprising:

at least one exit window through which light leaves said at least one light source.

4. The smart adaptive wavelength lighting system of claim 3, further comprising:

at least one optical filter window that prevents light in front of said least one exit window from entering said at least one light measuring device by narrowing a wavelength range thereof.

5. The smart adaptive wavelength lighting system of claim 2, further comprising:

at least one sensor connected to said at least one light source and driving stabilization module from an exit of said at least one light source.

6. The smart adaptive wavelength lighting system of claim 5, wherein said at least one sensor is photodiode.

7. The smart adaptive wavelength lighting system of claim 6, further comprising:

a plurality of sensor cables connecting said at least one sensor from the exit of said at least one light source to said at least one light source and driving stabilization module.

8. The smart adaptive wavelength lighting system of claim 1, further comprising:

at least one supply connector being a lower connection for said at least one lighting device.

9. The smart adaptive wavelength lighting system of claim 8, further comprising:

at least one power supply allowing power to said at least one lighting device to be adjust through said at least one supply connector.

10. The smart adaptive wavelength lighting system of claim 1, further comprising:

at least one exit window through which light leaves said at least one light source.

11. The smart adaptive wavelength lighting system of claim 1, further comprising:

a device box receiving and keeping together said at least one lighting device.

12. A smart adaptive wavelength lighting system that allows monitoring in a dark environment on which light measurements are performed at a certain wavelength without affecting a performed measurement, the smart adaptive wavelength lighting system comprising:

at least one light measuring device comprising:

at least one filter wheel having an optical filter in a desired wavelength range wherein the measurement in performed; and at least one photometer that counts photons in polychromatic light from the measurement passing through the optical filter after the optical filter has been selected from the at least one filter wheel;

at least one camera that observes the dark environment of the light measurement; and at least one lighting device that illuminates the dark environment, wherein said at least one lighting device comprises:

at least one light source that produces light at different wavelength ranges;

at least one filter module that receives information about the selected optical filter on said at least one filter wheel;

at least one central control and calculation module in which data is processed and in which the smart adaptive wavelength system is controlled by receiving information from the selected optical filter from said at least one filter module; and at least one light source and driver stabilization module that activates the at least one light source at a wavelength outside the wavelength range of the selected optical filter upon a command received from said at least one central control and calculation module.

13. The smart adaptive wavelength lighting system of claim 12, further comprising:

at least one sensor connected to said at least one light source and driving stabilization module from an exit of said at least one light some.

14. The smart adaptive wavelength lighting system of claim 13, wherein said at least one sensor is photodiode.

15. The smart adaptive wavelength light system of claim 14, further comprising:

a plurality of sensor cables connecting said at least one sensor from the exit of said at least one light source to said at least one light source and driving stabilization module.

16. A smart adaptive wavelength lighting system that allows monitoring in a dark environment on which light measurements are performed at a certain wavelength without affecting a performed measurement, the smart adaptive wavelength lighting system comprising:

at least one light measuring device comprising:

at least one filter wheel having an optical filter in a desired wavelength range wherein the measurement in performed; and at least one photometer that counts photons in polychromatic light from the measurement passing through the optical filter after the optical filter has been selected from the at least one filter wheel;

at least one camera that observes the dark environment of the light measurement; and at least one lighting device that illuminates the dark environment, at least one data cable that carries the information from the selected optical filter between said at least one light measuring device and said at least one lighting device.

17. The smart adaptive wavelength lighting system of claim 16, further comprising:

at least one data connector on said at least one lighting device connected to said at least one data cable.

* * * * *